June 8, 1926.

H. HOUK 1,587,838

CONTROL HEAD FOR GAS AND OIL WELLS

Filed April 9, 1925      2 Sheets-Sheet 1

Inventor

Harlan Houk

By Watson E. Coleman

Attorney

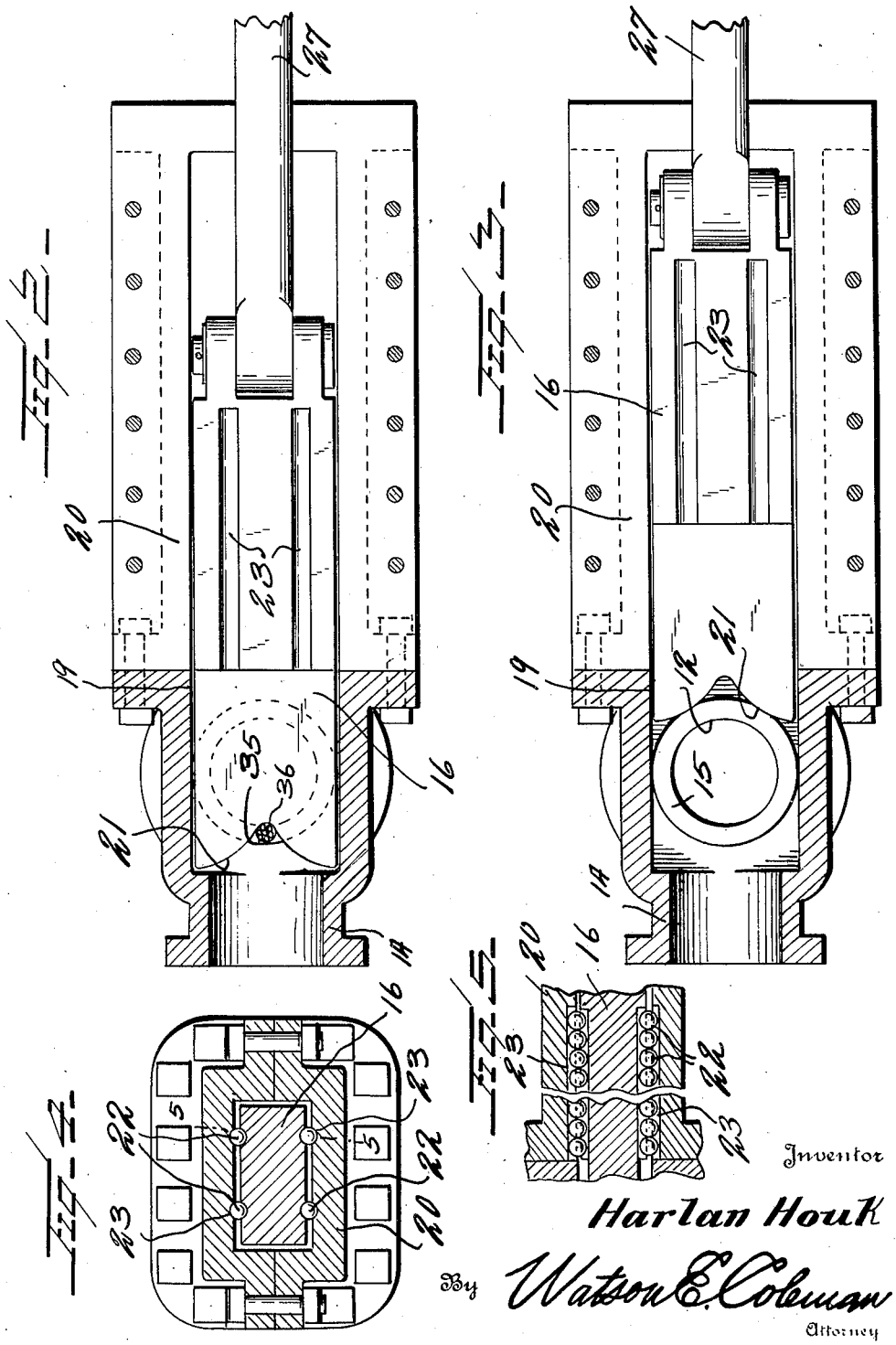

Patented June 8, 1926.

1,587,838

UNITED STATES PATENT OFFICE.

HARLAN HOUK, OF FORT COLLINS, COLORADO.

CONTROL HEAD FOR GAS AND OIL WELLS.

Application filed April 9, 1925. Serial No. 21,939.

This invention relates to devices for cutting off the discharge of oil or gas from a well as, for instance, should the gas catch fire or should the discharge of oil be sudden and liable to waste.

The general object of the invention is to provide a mechanism of this kind which is capable of operation by a person at a distance from the well and which will positively and certainly cut off the flow of gas or oil from the well.

A further object is to provide a mechanism of this character which may be used to cut off the flow of gas or oil even when the drill rope or cable is extending down through the casing head or casing and the tools are in the casing.

A still further object is to provide a device of this kind which will operate notwithstanding the pressure of the oil or gas.

Other objects will appear in the course of the following description.

My invention is illustrated in the accompanying drawings, wherein:—

Figure 2 is a top plan view partly in section of the construction shown in Figure 1, the upper plate of the valve housing 20 being removed;

Figure 3 is a like view to Figure 2 but showing the valve or gate retracted;

Figure 4 is a section on the line 4—4 of Figure 1;

Figure 5 is a fragmentary section on the line 5—5 of Figure 4.

Figure 1:
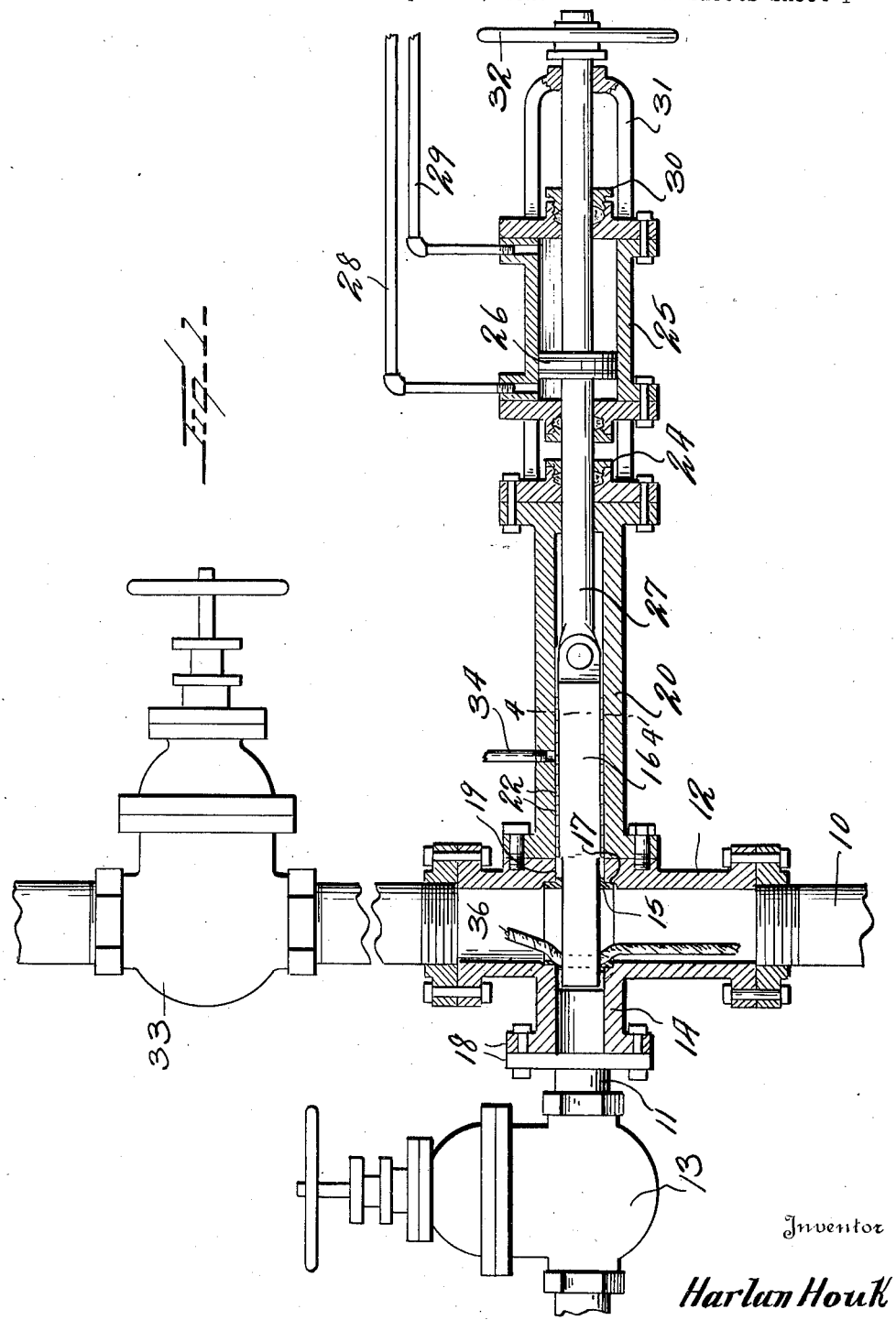
Figure 1 is a longitudinal sectional view partly in elevation of a control head for gas and oil wells constructed in accordance with my invention showing the gate or valve closed.

Referring to the drawings, 10 designates the casing of a gas or oil well, this casing having a laterally extended discharge branch 11 connected to the casing 10 by a valve housing 12. This discharge pipe 11 may have in its length a valve 13 of ordinary form as, for instance, a globe or gate valve whereby to cut off the flow of oil through this branch 11. So far I have described what is commonly found in wells of this character.

The housing or casing 12 is formed at one point with a branch 14 leading into the pipe 11 and at the junction of this branch 14 with the housing 12 there are two valve seats 15 to fit and bear against a sliding valve or gate 16. The valve seats 15 are disposed in recessed portions 17 formed in the housing and the sections 11 and 14 are flanged, as at 18, and held together by bolts or any other suitable means. The housing 12 has an opening 19 immediately opposite the branch 14 and is connected to a gate housing or valve housing 20, this valve housing being rectangular in section, as shown in Figure 4, and operating within the valve housing is the gate valve 16. The gate valve at its end confronting the branch 14 is notched at 21 for a purpose to be later slated, this cut away part being approximately V-shaped. The upper and lower faces of the gate valve 16 engage with a series of ball or roller bearings 22 carried within the housing 20 and mounted in any suitable manner. Thus the opposed faces of the housing and of the valve 16 may be formed with raceways or longitudinally extending recesses 23 within which the balls may be disposed, as shown most clearly in Figure 4.

This housing is preferably formed of two semi-circular sections bolted together, as shown in Figure 4, and the end of the housing is formed with a flange with which the flange of a stuffing box 24 is engaged, this stuffing box in turn being engaged with one end of a hydraulic or steam cylinder 25 within which operates the piston head 26. This piston head is connected by a connecting rod 27 to the gate valve 16, to which it is preferably pivoted. It is obvious now that when steam, water or other fluid under pressure is admitted behind the piston head that the piston head will be forced forward and the gate will be shoved into position across the passage in the housing, plugging branch 14, thus cutting off the flow of gas through the housing 12. On the other hand, when the gate is retracted the gas can pass up through this housing 12.

It will be obvious from Figure 2 that by reason of the fact that the notch 21 has its walls extending to the side edges of the rectangular valve 16 and the drill cable will always be guided to the middle of this notch, it cannot by any chance lodge against any other portion of the valve 16, thus holding the valve 16 from being fully closed. No matter where the cable is, it will be guided to this central portion 36 of the notch, thus permitting the valve to be fully closed to thus cut off the passage of gas. This is important, as unless this valve is entirely cut off the gas will burn above the valve.

I have illustrated two pipes 28 and 29 by which steam or other fluid under pressure may be delivered to one end of the cylinder 25 or the other end thereof for the purpose of shifting the piston in one direction to close the gate or in the other direction to open the gate. I have illustrated the piston rod 27 as passing out through a stuffing box 30 in the end of the cylinder and passing through a guide loop 31 and as having a handle 32 at one end thereof whereby the piston rod may be manually manipulated. The housing 12 has engagement with a valve casing 33 which is provided with a valve of any ordinary type such, for instance, as an ordinary globe valve. A steam line 34 enters the gate housing 20 between the heads 24 and 15 so as to discharge steam around the gate valve in case the latter is frozen. Thus I have provided means whereby to thaw the valve in case it is frozen or contracted by gas.

It will be understood that the well is to be worked through the valve 33 and through the bore of the housing 12, but that if gas or oil is struck the tools are to be gotten out if possible, then going to the boiler house or at any other safe distance the gate 16 is closed by pumping water into the cylinder 25 behind the piston or sending steam into the cylinder behind the piston. This will cause the closing of the valve and the cutting off of the well, even though the valve 13 is not closed. If it is impossible to get the drill and cable out, then close the gate as far as possible and the notch 21 in the gate will accommodate the cable, as shown, this cable being bent or deflected to a certain extent so as to practically stop the flow. The cable then may be cut at the top of the casing and the valve 33 may be closed. It will be obvious that there is no moving part exposed; the entire valve, water lines and steam line might be buried under ground, then should the gas catch fire as soon as it reaches the mouth of the casing the fire could be brought under control and in a few minutes by a single man. Inasmuch as the gate is mounted upon roller bearings, it is obvious that the pressure of the gas or oil which will be at right angles to the travel of the gate will not affect the movement of the gate but that the pressure will be thrown upon the roller bearings.

While I have illustrated a construction which I believe to be particularly effective for the purpose described, I do not wish to be limited to the details of this as it is obvious that many minor changes might be made in the details of construction and arrangement of parts without departing from the spirit of the invention as defined in the appended claims. Thus, for instance, the particular construction of the valve seats and valve 16 might be changed to a considerable extent and yet provide for the passage of the cable and a practically gas-tight engagement of the valve 16 with the seats 15. It will be also noted that the housing 20 and allied parts are made in two sections held together by bolts, as shown in Figure 4, so that it may be readily put in place or removed for repairs. I do not wish to be limited to this construction, however.

I claim:—

1. The combination with a well casing and a housing forming an extension thereof, the housing being formed with a branch on one side and an aperture immediately opposite said branch, a valve housing attached to the first named housing and into which said aperture opens, a gate valve operating in the valve housing and operating through the aperture and adapted to be projected so as to carry the valve into the branch entirely across the first named housing, manually controllable means for shifting said valve into or out of its projected position, the free extremity of the valve being formed with a notch extending parallel to the axis of the casing, the side walls of the notch extending to the side edges of the valve, the notch being adapted to guide a cable to the middle of the inner end of the notch and accommodate said cable when the valve is fully closed, and packing members constituting valve seats disposed adjacent said opening in the first named housing and contacting with the valve and packing the same, the branch opposite the opening being so formed as to permit the valve to extend into the branch and permit the cable when on the bottom of the notch to be jammed against the walls of said branch above and below the valve.

2. The combination with a well casing, of means for cutting off the flow of fluid through the well casing comprising a valve housing extending laterally from the well casing, the well casing having a recess immediately opposite said housing, a valve operating in the housing, the valve having in its free edge a V-shaped notch, the side walls which extend to the side edges of the valve, and manually controlled means for shifting the valve out of or into the housing.

3. The combination with a well casing, of means for cutting off the flow of fluid through the well casing comprising a valve housing extending laterally from the well casing and opening thereinto, there being a branch extending laterally from the well casing opposite said housing, the valve housing being rectangular in cross section and having a width greater than the diameter of the well casing, a valve disposed within said valve housing and reciprocatable therethrough and adapted to be shifted across the well casing and into said branch, the extremity of the valve being formed with a V-shaped notch, the side walls of which extend to the side edges of the valve, and manually controlled means for shifting the valve out of or into the housing.

4. The combination with a well casing, of means for cutting off the flow of fluid through the well casing comprising a tubular member forming an extension of the well casing and having a lateral branch and an opening immediately opposite said branch, the opening being rectangular and the branch at its junction with said member being enlarged to form a rectangular recess, a valve housing rectangular in cross section and attached to said member and extending laterally from the opening thereof, a valve rectangular in cross section and disposed in said housing and fitting the same, the valve having an area greater than the interior area of said member and when projected fitting into the recess formed at the junction of the member with the branch, said valve being formed at its outer end with a V-shaped recess the side walls of which extend to the side edges of the valve, the notch being adapted to receive a drilling cable when the valve is closed, and means for manually controlling said valve.

5. The combination with a well casing, of means for cutting off the flow of fluid through the well casing comprising a valve housing rectangular in cross section and extending laterally from the well casing, the well casing being formed opposite said housing with a rectangular recess, a rectangular valve operating within the valve housing and projectible across the casing into said recess, anti-friction bearings for the valve disposed in said valve housing, said bearings spacing the valve from the interior face of the valve housing, packing members carried by the casing at the entrance to the housing and through which said valve passes to thereby prevent the passage of gas into the interior of the housing, a pipe for admitting heated fluid to the interior of the housing, a rod attached to the valve and passing through the rear end of the housing, and means controllable for a distance whereby said valve may be shifted inward or outward, the inner end of the valve being formed with a V-shaped recess having its side walls extending to the side edges of the valve and adapted to guide the cable to the middle of the recess and to engage said cable when the valve is closed.

In testimony whereof I hereunto affix my signature.

HARLAN HOUK.